3,553,143
AMMONIUM HYDROXIDE CONTAINING WAX STRIPPER
Henry Bauer, San Pedro, Calif., assignor to Purex Corporation, Lakewood, Calif., a corporation of California
No Drawing. Filed Jan. 18, 1967, Ser. No. 610,013
Int. Cl. C11d 1/62
U.S. Cl. 252—152                                      5 Claims

ABSTRACT OF THE DISCLOSURE

A novel wax stripping composition is provided consisting essentially of a quaternary ammonium hydroxide in an aqueous alkaline solution, having a pH of at least 12, in effective proportions generally comprising at least 0.01% by weight of quaternary ammonium hydroxide. The quaternary ammonium hydroxide may be generated in situ in the solution by addition of an hydroxyl ion donor compound such as an alkali metal hydroxide or tertiary ammonium hydroxide and a water soluble, cationic, alkyl substituted quaternary ammonium salt.

BACKGROUND OF THE INVENTION

(1) Field of the invention

The invention provides a composition useful in the building maintenance art, specifically in the maintenance of wax preserved surfaces such as floors and woodwork of wooden or synthetic, e.g., plastic material.

(2) Description of the prior art

Wax stripping compositions presently known are generally anionic and insufficiently effective against synthetic polymeric waxes currently increasingly used. Compositions for other purposes containing quaternary ammonium salts are known, especially for germicidal uses, but the effectiveness of even quite small amounts of quaternary ammonium hydroxide as a stripper of synthetic waxy polymers has not been recognized prior to the present invention.

SUMMARY OF THE INVENTION

Composition is provided, and method for its use including contacting a wax-protected surface with a composition which consists essentially of an aqueous alkaline solution of a quaternary ammonium hydroxide. To insure presence of the desired hydroxide at the time of application, the solution should have a pH of at least 12 and above. The quaternary ammonium hydroxide may be generated in situ by the reaction of an hydroxyl ion donor, such as an alkali metal- or ammonium-hydroxide with a quaternary ammonium salt.

DESCRIPTION OF THE PREFERRED EMBODIMENTS

Example 1

A wax stripping composition having a quaternary ammonium hydroxide concentration above 0.01% was prepared by forming a solution of 1 part (vol.) of the following in 19 parts (vol.) of water.

| Compound: | Percent by weight |
|---|---|
| $Na_2SiO_3 \cdot 5H_2O$ | 5.34 |
| $Na_4P_3O_{10}$ | 1.70 |
| Tetrasodium salt of ethylene diamine tetraacetic acid | 1.36 |
| Alkylphenoxypoly(ethyleneoxy)ethanol | 3.41 |
| Aqua ammonia (26° Bé.) (28%) | 1.00 |
| Myristyldimethylbenzylammonium chloride | 2.28 |
| Water, q.s. to 100%. | |

The presence of alkaline builder salts such as sodium silicates and phosphates is illustrative and not required; but their presence is a convenient expedient to raise the pH of the solution to desired level.

Example 2

A second composition was prepared omitting the aqua ammonia and adding in lieu thereof 0.16% by weight KOH.

Both compositions before dilution had pH levels above 13. For testing, the compositions were diluted with distilled water to 5% concentration thereby reducing pH to above 12. Following dilution, the compositions were applied to test panels of floor tile which had been provided with a thermally aged coating of a commercial synthetic organic polymer wax of the "vinyl" type.

A pad was mechanically rubbed over the test panels and results noted. For control purposes, a similar formulation, without any quaternary ammonium hydroxide however, was similarly tested, as was a leading commercial wax stripper composition.

The compositions of Examples 1 and 2 were fastest in cleaning away the obdurate wax coating and, interestingly, cleaned the tile surface completely and evenly while the control and commercial product were unevenly effective and both left areas of unremoved wax even after 50% more cycles.

The quaternary ammonium hydroxide in Example 1 was generated in situ from the hydroxyl ions donated by the aqua ammonia and the quaternary ammonium ions produced in the alkaline solution by the dissociation of the quaternary ammonium salt in the highly alkaline environment created by the presence of builder salts, sodium metasilicate and phosphate in the aqueous medium. In Example 2 the in situ generation of quaternary ammonium hydroxide was the result of the interaction of KOH and the quaternary ammonium salt in the alkaline medium.

The hydroxyl donor compound herein is conveniently a water soluble metal hydroxide such as an alkali metal or alkaline earth metal hydroxide, e.g. lithium, sodium or potassium hydroxide and calcium or magnesium hydroxide.

Among the quaternary ammonium salts which can be employed to form the corresponding hydroxides in the invention, there may be mentioned these illustrative materials:

myristyldimethylbenzylammonium chloride
cetyltrimethylbenzylammonium chloride
N-fattytrimethylammonium chloride
di-N-fatty dimethylammonium chloride
stearyldimethylbenzylammonium chloride
tallow-dimethylbenzylammonium chloride
phenyltrimethylammonium chloride
dodecylbenzenetrimethylammonium chloride
ditallow-dimethylammonium chloride
cetyldimethylethylammonium chloride
distearyldimethylammonium chloride
dicocodimethylammonium chloride
disoyadimethylammonium chloride
alkyldimethylbenzylammonium chloride
dialkyl ($C_{12,14,16}$) methylbenzylammonium chloride
alkyldimethylnaphthylmethylammonium chloride
alkyldimethyldichlorobenzylammonium chloride
alkyl ($C_8$–$C_{18}$) dimethylbenzylammonium chloride
diisobutylcresoxyethoxyethyldimethylbenzylammonium chloride
diisobutylphenoxyethoxyethyldimethylbenzylammonium chloride
methyldodecylbenzyltrimethylammonium chloride
methyldodecylxylene bis(trimethylammonium chloride)

N-alkylbenzyldiethylhydroxyethylammonium chloride
alkyldimethylhydroxyethylammonium chloride
lauryldimethylbenzylammonium chloride
cetyltrimethylammonium bromide
alkyldimethylbenzylammonium bromide
dialkyldimethylammonium bromide
alkenyldimethylethylammonium bromide
alkenyldimethylethylammonium bromide
alkyldimethylhydroxyethylammonium bromide
stearamidopropyldimethyl-B-hydroxyethylammonium nitrate
cetyltrimethylammonium stearate
cetyltrimethylammonium formate
cetyltrimethylammonium lactate
N-cetylethylmorpholinium ethosulfate, and
N-soyaethylmorpholinium ethosulfate
cetylpyridinium chloride
cetylpyridinium bromide
alkylmethylisoquinolinium chloride
laurylpyridinium chloride
laurylpyridinium bisulfate
N-(lauroyl colamino formyl methyl) pyridinium chloride
tetradecylpyridinium bromide
alkylisoquinolinium bromide
laurylisoquinolinium bromide
1 (2-hydroxyethyl)-2-n-alkylbenzyl imidazoline chloride
1 (2-aminoethyl)-2-heptadecadienyl-4-chlorobutyl imidazoline chloride, and
fatty glyoxalidinium chloride.

It will be recognized that the foregoing quaternary ammonium compounds, which are precursors to the hydroxide compounds of interest can be broadly classified as cationic and as (1) tetraorgano, particularly tetralkyl- and tetra (substituted alkyl)-substituted quaternary ammonium salts of organic and inorganic acids, such as the haloacids, especially the chloro and bromo acids and oxygen containing inorganic acids, (2) alkyl pyridinium halides, (3) alkyl morpholinium salts of oxygen containing inorganic acids especially the sulfate salt, and (4) the alkyl and substituted-alkyl substituted imidazoline salts of inorganic acids particularly the chloride salts of these compounds.

The tetra-organo-substituted quarternary ammonium salts are the preferred class of precursors and within this class the tetraalkyl-substituted chloride and bromide quaternary ammonium salts, derived from haloacids in which the halogen has an atomic weight between 35 and 80, are particularly effective. The term "alkyl" herein for convenience is used to include aryl- and hydroxyl-substituted alkyl groups such as benzyl and hydroxyethyl where bonding to the ammonium nitrogen is through an alkyl carbon atom.

These preferred salts can be structurally depicted as

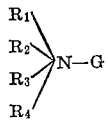

in which G is an anion such as a halide, e.g. chloride or bromide; an inorganic oxygen containing radical, e.g. nitrate, sulfate or phosphate; an organic acid radical, e.g. a lower fatty acid radical including their hydroxy substituted analogs such as formate, acetate, propionate, glycolate and lactate radicals and in which:

$R_1$ is a straight chain aliphatic radical free of acetylenic unsaturation and preferably contains 8 to 18 carbon atoms inclusive; and $R_2$, $R_3$ and $R_4$ are each saturated aliphatic radicals free of other than aryl, aryloxy, alkoxy and hydroxyl substituents.

The concentration of quaternary ammonium hydroxide is not narrowly critical but should in all events be above 0.01% by weight of the final formulation. Such concentrations are achieved with mixtures of at least about 0.0125% and preferably 0.025% by weight of hydroxyl ion donor and 0.025% and preferably 0.05% by weight of quaternary ammonium salt. Upper limits of concentration of these quaternary ammonium hydroxide precursors are dictated primarily by economic and solubility considerations with a practical maximum being about 3% of either precursor in the diluted-for-application product.

As illustrated in the examples for achieving the required pH level of (A) 12 to (B) 13 and higher (by glass electrode determination) for the diluted (A) or concentrate (B) product respectively use is made of alkaline builders. These materials and their function is well known so an elaborate description is not needed here. It will be recognized that in addition to sodium metasilicate illustrated in the examples in which the mol ratio of $Na_2O/SiO_2$ is equal to 1 other silicates, in which this ratio is greater than 1 can be used, e.g. supersilicates and ortho-silicates which have ratios of 1.6 and 2.0 respectively, as can silicates having such ratios lower than 1 such as water glass or trisilicate and disilicate materials having this ratio at 0.3 and 0.5 respectively. With these various silicates adjustments may be made in the amount of hydroxyl ion donor employed to compensate for consumption of the donor compound by the silicate as occurs with a less than 1.0 ratio silicate. Metasilicate is a preferred alkaline builder among the silicates, but other builders can be used in full or partial replacement thereof, such as trisodium phosphate and tripotassium phosphate as well as the various acid salts, e.g. phosphates, carbonates and borates, with appropriate stoichiometric adjustment to maintain final product pH above about 12.

It is desirable to include inorganic and/or organic sequestrants in the product because polyvalent metal ions which may be initially present in the waxy polymers as cross-linkers on which may have been deposited on the waxed surface as dust, dirt, soil or dried spillage of water or dairy products impede the wax removal process by interfering with the dissolution of the fatty acid soaps and emulsifiers found in wax formulations by forming insoluble polyvalent metal salts therewith rendering the surface hydrophobic. Both inorganic and organic sequestrants preferentially form harmless complexes with these polyvalent ions. For this purpose glassy polyphosphates $Na_2O(NaPO_3)_n$ and polymetaphosphates $(NaPO_3)_n$ in which $n$ is a positive integer can be used with or in place of the sodium tripolyphosphate of Examples 1 and 2 with appropriate stoichiometric adjustment to retain proper $OH^-$ concentration. The tetrasodium salt of ethylene diamine tetraacetic acid of the examples is an organic sequestrant and typical of aminocarboxylate sequestrants.

The range of concentration of the alkaline builders and the sequestrants is not narrowly critical and effective amounts will be used. Typically the final, diluted product will contain at least about 0.125% and preferably 0.25% by weight sodium metasilicate; at least about 0.02% and preferably 0.04% by weight organic and inorganic sequestrant.

As with the essential components of water, hydroxyl ion donor and quaternary salt, the upper limit on the additive components such as alkaline builders, sequestrants and surfactants such as ethoxylated alkyl phenols (present in effective amounts typically ranging from a minimum of 0.02% and preferably 0.04% by weight of the diluted final product) is the limit of solubility, alone, and in the presence of the other ingredients. The metasilicate generally will not be present in an amount over 0.75%, the surfactant not over 0.25% and the inorganic and organic sequestrants not over about 0.25% by weight, all in terms of the final diluted product as applied to the waxed surface.

I claim:

1. Method of stripping a wax coating from a surface including contacting said coating with a solution in an aqueous alkaline medium of at least 0.01% by weight of a quarternary ammonium hydroxide produced by reaction of between about 0.125 and 3.0% by weight of an hydroxyl donor compound selected from ammonium hydroxide and alkali metal hydroxide and between about 0.025 and 3.0% by weight of a water soluble, cationic alkyl substituted quarternary ammonium salt precursor for said quaternary ammonium hydroxide selected from the group consisting of:

(1) quaternary ammonium salts having the structure

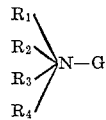

in which G is an anion selected from bromide, chloride, nitrate, sulfate, phosphate and lower fatty acid radicals, $R_1$ is a straight chain aliphatic hydrocarbon radical of 18 to 18 carbon atoms inclusive free of acetylenic unsaturation, $R_2$, $R_3$ and $R_4$ are each selected from the group consisting of lower saturated aliphatic hydrocarbon radicals and aryl, aryloxy, alkoxy and hydroxyl derivatives thereof, said solution having a pH above 12.

(2) alkyl substituted pyridinium chlorides, bromides, and bisulfates wherein the alkyl group is from 8 to 18 carbon atoms, (3) alkyl substituted morpholinium halides, sulfates, nitrates, and phosphates containing an alkyl group of from 8 to 18 carbon atoms;

(4) alkyl substituted isoquinolinium chlorides and bromides containing an alkyl group of from 8 to 18 carbon atoms; and (5) alkyl substituted imidazolinium chlorides, bromides, nitrates, phosphates or sulphates, containing an alkyl group of from 8 to 18 carbon atoms, 2. Method according to claim 1 in which said salt is myristyldimethylbenzylammonium chloride.

3. Method according to claim 1 in which said quaternary ammonium salt is selected from myristyldimethylbenzylammonium chloride
cetyltrimethylbenzylammonium chloride
N-fattytrimethylammonium chloride
di-N-fatty dimethylammonium chloride
stearyldimethylbenzylammonium chloride
tallow-dimethylbenzylammonium chloride
phenyltrimethylammonium chloride
dodecylbenzenetrimethylammonium chloride
ditallow-dimethylammonium chloride
cetyldimethylethylammonium chloride
distearyldimethylammonium chloride
dicocodimethylammonium chloride
disoyadimethylammonium chloride
alkyldimethylbenzylammonium chloride
dialkyl ($C_{12, 14, 16}$) methylbenzylammonium chloride
alkyldimethylnaphthylmethylammonium chloride
alkyldimethyldichlorobenzylammonium chloride
alkyl ($C_8$–$C_{18}$) dimethylbenzylammonium chloride
diisobutylcresoxyethoxyethyldimethylbenzylammonium chloride
diisobutylphenoxyethoxyethyldimethylbenzylammonium chloride
methyldodecylbenzyltrimethylammonium chloride
methyldodecylxylene bis(trimethylammonium chloride)
N-alkylbenzyldiethylhydroxyethylammonium chloride
alkyldimethylhydroxyethylammonium chloride
lauryldimethylbenzylammonium chloride
cetyltrimethylammonium bromide
alkyldimethylbenzylammonium bromide
dialkyldimethylammonium bromide
alkenyldimethylethylammonium bromide
alkyldimethylhydroxyethylammonium bromide
stearamidopropyldimethyl-B-hydroxethylammonium nitrate
cetyltrimethylammonium stearate
cetyltrimethylammonium formate
cetyltrimethylammonium lactate
N-cetylethylmorpholinium ethosulfate, and
N-soyaethylmorpholinium ethosulfate
cetylpyridinium chloride
cetylpyridinium bromide
alkylmethylisoquinolinium chloride
laurylpyridinium chloride
laurylpyridinium bisulfate
N-(lauroyl colamino formyl methyl) pyridinium chloride
tetradecylpyridinium bromide
alkylisoquinolinium bromide
laurylisoquinolinium bromide
1 (2-hydroxyethyl)-2-n-alkylbenzyl imidazoline chloride
1 (-aminoethyl)-2-heptadecadienyl-4-chlorobutyl imidazoline chloride and
fatty glyozalidinium chloride in each of which salts the alkyl or alkenyl groups contain from 8 to 18 carbon atoms unless otherwise specified.

4. Method according to claim 1 in which said solution comprises:

|  | Weight percent |
|---|---|
| Sodium metasilicate | 0.125–0.75 |
| Sodium triphosphate | 0.02–0.25 |
| Tetrasodium salt of ethylene diamine tetraacetic acid | 0.02–0.25 |
| Alkylphenoxypoly(ethyleneoxy)ethanol | 0.02–0.25 |
| Hydroxyl ion donor: aqua ammonia or water soluble metal hydroxide | 0.0125–3.0 |
| Alkyl ($C_8$–$C_{18}$) dimethyl benzylammonium chloride | 0.025–3.0 |
| Water, q.s. to 100% | |

5. Method according to claim 1 in which said wax is a synthetic organic polymeric wax.

References Cited

UNITED STATES PATENTS

| | | | |
|---|---|---|---|
| 2,047,191 | 5/1932 | Buc et al. | 87—5 |
| 2,242,224 | 5/1941 | Bley | 260—567.6 X |
| 2,295,504 | 9/1942 | Shelton | 252—152 X |
| 2,314,285 | 3/1943 | Morgan | 252—156 X |
| 2,727,007 | 12/1955 | Little et al. | 252—137 X |
| 2,758,948 | 8/1956 | Simon et al. | 134—40 X |
| 3,007,877 | 11/1961 | Allen | 252—137 X |
| 2,055,726 | 9/1962 | Rudy et al. | 252—137 X |
| 3,077,929 | 2/1963 | Fetkovich | 134—40 X |
| 3,360,470 | 12/1967 | Wixon | 252—174 X |
| 3,391,084 | 7/1968 | York | 134—40 X |

M. HALPERN, Assistant Examiner

LEON D. ROSDOL, Primary Examiner

U.S. Cl. X.R.

252—137, 156